US005711411A

United States Patent [19]
Zurweller

[11] Patent Number: 5,711,411

[45] Date of Patent: Jan. 27, 1998

[54] QUICK CHANGEOVER FILLING, CENTERING BRACKET

[75] Inventor: William Joseph Zurweller, Florissant, Mo.

[73] Assignee: Lever Brothers Company, Division of Conopco, Inc., New York, N.Y.

[21] Appl. No.: 557,748

[22] Filed: Nov. 13, 1995

[51] Int. Cl.[6] .......... B65G 25/00

[52] U.S. Cl. .......... 198/470.1; 198/379

[58] Field of Search .......... 198/345.1, 379, 198/470.1, 481.1, 473.1, 480.1

[56] References Cited

U.S. PATENT DOCUMENTS

| | | | |
|---|---|---|---|
| 1,017,038 | 2/1912 | Champ . | |
| 1,574,307 | 2/1926 | Risser . | |
| 2,142,257 | 1/1939 | Saeta . | |
| 2,698,076 | 12/1954 | Nilsson . | |
| 2,713,960 | 7/1955 | Segal . | |
| 2,865,158 | 12/1958 | Wakeman | 198/474.1 |
| 3,090,478 | 5/1963 | Stanley . | |
| 3,109,535 | 11/1963 | Norwood . | |
| 3,754,637 | 8/1973 | Carter et al. | 198/470.1 |
| 3,889,800 | 6/1975 | Frische . | |
| 3,934,714 | 1/1976 | Matsumoto | 198/379 |
| 4,075,086 | 2/1978 | Marsh, III et al. . | |
| 4,185,812 | 1/1980 | Hall . | |
| 4,200,183 | 4/1980 | Riggs . | |
| 4,280,612 | 7/1981 | Nagano | 198/379 |
| 4,312,439 | 1/1982 | Young | 198/470.1 X |
| 4,467,909 | 8/1984 | Jorss . | |
| 4,512,456 | 4/1985 | Peyton | 198/470.1 |
| 4,635,662 | 1/1987 | Totten . | |
| 4,716,714 | 1/1988 | Tisma . | |
| 4,787,505 | 11/1988 | Tweedy . | |
| 4,807,421 | 2/1989 | Araki et al. . | |
| 5,029,695 | 7/1991 | Kovara . | |
| 5,082,105 | 1/1992 | Tincati . | |
| 5,127,514 | 7/1992 | Guttinger et al. . | |

FOREIGN PATENT DOCUMENTS

| | | | |
|---|---|---|---|
| 2077684 | 12/1981 | United Kingdom | 198/379 |

*Primary Examiner*—James R. Bidwell
*Attorney, Agent, or Firm*—Gerard J. McGowan, Jr.

[57] ABSTRACT

A device which centers bottles beneath a filling nozzle and which can be very quickly changed when there is a change in the bottles being run on the line. The device includes an upper bracket which receives the mouth of the bottle and may also include a lower foot against which the back of the bottle is received. The bracket holds the bottle while the bottle is filled. Both the mouth receiving bracket and the foot against which the back of the bottle rests are readily changeable with brackets and feet, respectively, of other sizes. Typically the bottles will be conveyed to the bracket by a star wheel.

7 Claims, 5 Drawing Sheets

QUICK CHANGEOVER FILLING, CENTERING BRACKET

BACKGROUND OF THE INVENTION

Liquid detergents and fabric softeners are popular product forms, particularly in view of the convenience which liquids provide. When liquid detergent or fabric softener or other liquid products are filled, the empty bottles need to be positioned beneath a filling nozzle. It will be appreciated that there is a need to place the bottles beneath the nozzle for the minimum period of time possible, to keep the manufacturing line moving at the fastest possible speed consistent with safety and minimization of problems which could stop the line.

A previous centering device included a bell, which is a complicated apparatus including a moving part which comes down over each bottle mouth. One difficulty associated with the use of such devices is encountered when it is necessary to change the size or type of bottle being run on the line. The change in the bottle often necessitated changing of the bell. Changing of the bell often required a couple of hours or more and formed an obstacle to the efficient use of the manufacturing line. Particularly in the present business environment wherein it is important to be able to respond immediately to the needs of customers and wherein inventory is kept to a minimum, sufficient flexibility of the manufacturing line to permit quick changeover for running different types of products is critical.

Champ, U.S. Pat. No. 1,017,038 is directed to a bottle holder for bottle filling machines. The bottle includes a flange 8 for receiving and centering bottles of quart size. It is said that in order to adapt the holders for the reception of pint bottles, an additional member is provided. The member includes a tubular support adapted to fit over a rod mounted on the holder. The support includes at its lower end a curved flange which reduces the free space on the holder to the proper size and form to receive the bottom of a pint bottle. At its upper end, the additional member includes two fingers which are disposed to engage the upper portion of the bottle.

Risser, U.S. Pat. No. 1,574.307 discloses a bottle adapter for a bottle filling machine. Adapter blocks 42 or 44 include dowel pins 50 which enter holes provided for them in wheel 24. The invention provides interchangeable bottle holders, one style for each kind of size or bottle which is to go through the bottle filling machine. The retainers are interchangeably positionable on the bottle carrier mechanism so that by selectively equipping the machine with the proper size of bottle holder or retainer the mechanism will satisfactorily operate upon the particular type or shape of bottle which is to be handled.

Nilsson, U.S. Pat. No. 2,698,076 discloses a socket for receiving a tubular product which has an interior cross section which may be adjusted by means of a set screw 10 which can be inserted into a collar 6.

Norwood, U.S. Pat. No. 3,109,535 is directed to an adjustable bottle gripper for bottle filling machines. The gripper is adjustable for engaging containers of various sizes. All parts are said to be removable for individual cleaning, repair or replacement.

Frische, U.S. Pat. No. 3,889,800 is directed to a bottle chuck which may be readily and rapidly detachable from an overhead chuck conveyor by applying a downward force to disengage the spring loaded ball of a release means in a support plate from the circular concavity or recess of a lock pin protruding from the first support plate. Both the removal and replacement of the bottle chuck, it is said, can be done within a very small time period of from four to six seconds so that downtime is eliminated.

Marsh et al., U.S. Pat. No. 4,075,086 is directed to an apparatus for inspection of flask type glass containers. Neck holders 30, seen especially in FIG. 2, form an open pocket 54 which has substantially 180° contact with the neck portion of the glass container. The neck containers are locked into position by a lock pin 48.

Hall, U.S. Pat. No. 4,185,812 is directed to a pallet assembly for use in transfer of preheated plastic preforms from an oven through a blow mold where they are blown into bottles to a location where the bottles are discharged. A sliding pair of opposed V-jaws mounted adjacent a stop ring holds the preform there against. V-jaw actuating means in the form of cranks secured on shafts open and close the jaws in timed relation with loading and unloading functions. Each jaw is adjustably secured to a slide. The slides are biased together by a pair of helical springs. The jaws can be spaced as needed by loosening the pair of bolts holding each jaw to its respective slide. The Hall design is said to provide a structure which can easily be adjusted to accommodate different sizes of preform.

Riggs, U.S. Pat. No. 4,200,183 discloses an apparatus for moving glass containers on a horizontal conveyor. The apparatus includes a bottle engaging pocket. Each of the bottle pockets have interchangeable inserts to accommodate different sized bottles. Keys on the pocket members which are adapted to engage with the holders for the pocket members, may be spring biased downwardly within the holders to retain the pocket in their respective holders.

Jorss, U.S. Pat. No. 4,467,909 discloses an infeed or discharge star for transporting containers to a labelling or filling machine which includes a member rotatively mounted on a carousel, which member has a plurality of arcuate surfaces formed in its outer margin. Each surface has a different radius of curvature for engaging containers of different sizes and means for locking the members with one of the surfaces selectively facing outwardly relative to the carousel.

Totten, U.S. Pat. No. 4,635,662 discloses an inline bottle rinser having quick bottle size changeover capabilities. The bottle carriers are mounted so as to be automatically snapped off the transport system so that bottle carriers for other size bottles may be snapped onto the transport system for changeover purposes.

Tweedy, U.S. Pat. No. 4,787,505 is directed to an adjustable work piece carrier assembly for carrying work pieces on a conveyor system. Upstanding V-blocks used for supporting work pieces are changeable so as to allow work pieces of different configurations to be supported thereon. Screw members which are spring biased are used so that applying force to bias the springs allows a V-block to be quickly and simply detached from the assembly.

Araki, U.S. Pat. No. 4,807,421 discloses a container holder capable of holding various containers. A container holder having a plurality of claws 29 is shown in FIGS. 24 and 25.

Guttinger et al., U.S. Pat. No. 5,127,514 discloses a conveyor for a bucket which conveyor is of variable width. A spring loading locking means releasably retains serrated sections of one wall of the bucket in interlocking engagement with a base member at a desired bucket width.

Other patents discussing bottle holders and/or bottle filling machines include Saeta, U.S. Pat. No. 2,142,257; Siegal, U.S. Pat. No. 2,713,960; Stanley, U.S. Pat. No. 3,090,478; Tisma, U.S. Pat. No. 4,716,714; and Kovara, U.S. Pat. No. 5,029,695.

U.S. Bottlers Machinery Company sells a filler centering means which includes a centering bell or collar that fits down over the bottle neck and which also includes a positioning curve on the bottom. The changeover time is considerable. An Allen wrench may be needed in making the change.

SUMMARY OF THE INVENTION

The present invention is directed to a device which centers bottles beneath the filling nozzle and which can be very quickly changed when there is a change in the bottles being run on the line. The apparatus of the invention includes an upper bracket which receives the mouth of the bottle and may also include a lower foot against which the back of the bottle is received. The bracket holds the bottle, but not too tightly, while the bottle is filled. Both the mouth-receiving bracket and the foot against which the back of the bottle rests are readily changeable with brackets and feet, respectively of other sizes.

Typically, the bottles will be conveyed to the bracket of the invention by a star wheel, after which the bottle is filled by the filling nozzle. Once the bottle has been filled, the bottle is transported by an exiting star wheel and the next bottle is put into place. Because the bottle is removed by a star wheel, it is important that it not be too tightly held by the bracket.

In a preferred embodiment, the bracket comprises a plurality of bottle finish gripping arms which include a medially disposed finished-accommodating opening. The gripping arms also preferably include means urging .the gripping arms medially toward each other. The medial urging means may comprise, for example, a spring.

The bottle gripping arms are preferably borne by a gripper base which may be in the form of a supporting block. The gripper base removably supports the bottle gripping arms on a supporting column. Pivotally associated with the gripper base is a lever. The supporting column may be provided with a plurality of notches so that the lever may be rotated and positioned whereby the head of the lever is disposed within one of the notches to keep the height of the gripping means at a defined level. The height may be adjusted to one of at least two levels provided for by the notches.

The foot is preferably not physically attached to the gripping means or the apparatus supporting same. However, it is preferably readily removable from its base. For instance, the foot may be urged into association with the foot base by virtue of a spring. Force may be used to overcome the pressure exerted by the spring and thereby to remove the foot from its base.

For a more complete understanding of the above and other features and advantages of the invention, reference should be made to the following detailed description of preferred embodiments and to the accompanying drawings.

DETAILED DESCRIPTION OF THE INVENTION

Figure 1:
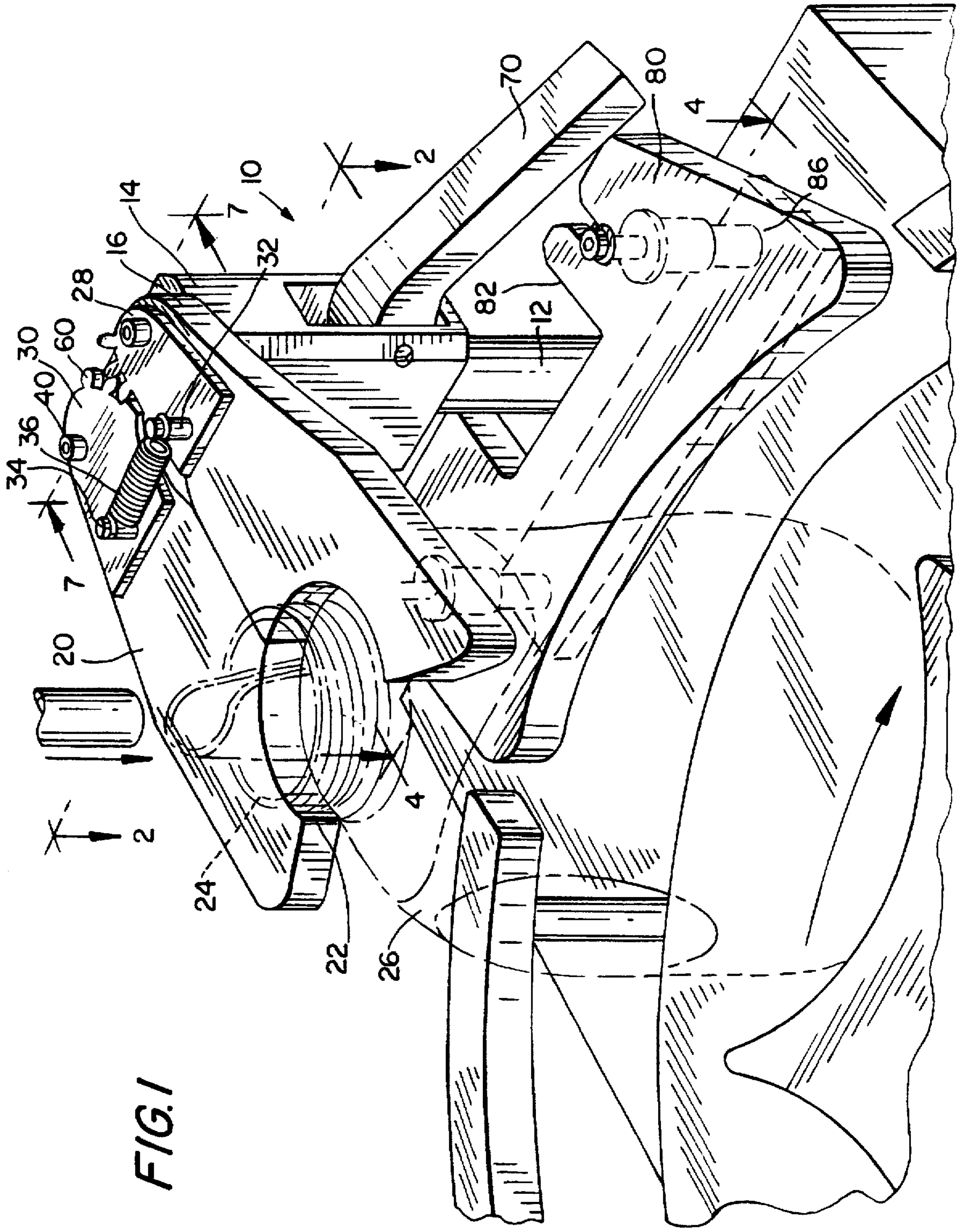
FIG. 1 is a perspective view of the combined removable and adjustable centering bracket and bottle supporting foot of the invention.
Figure 2:
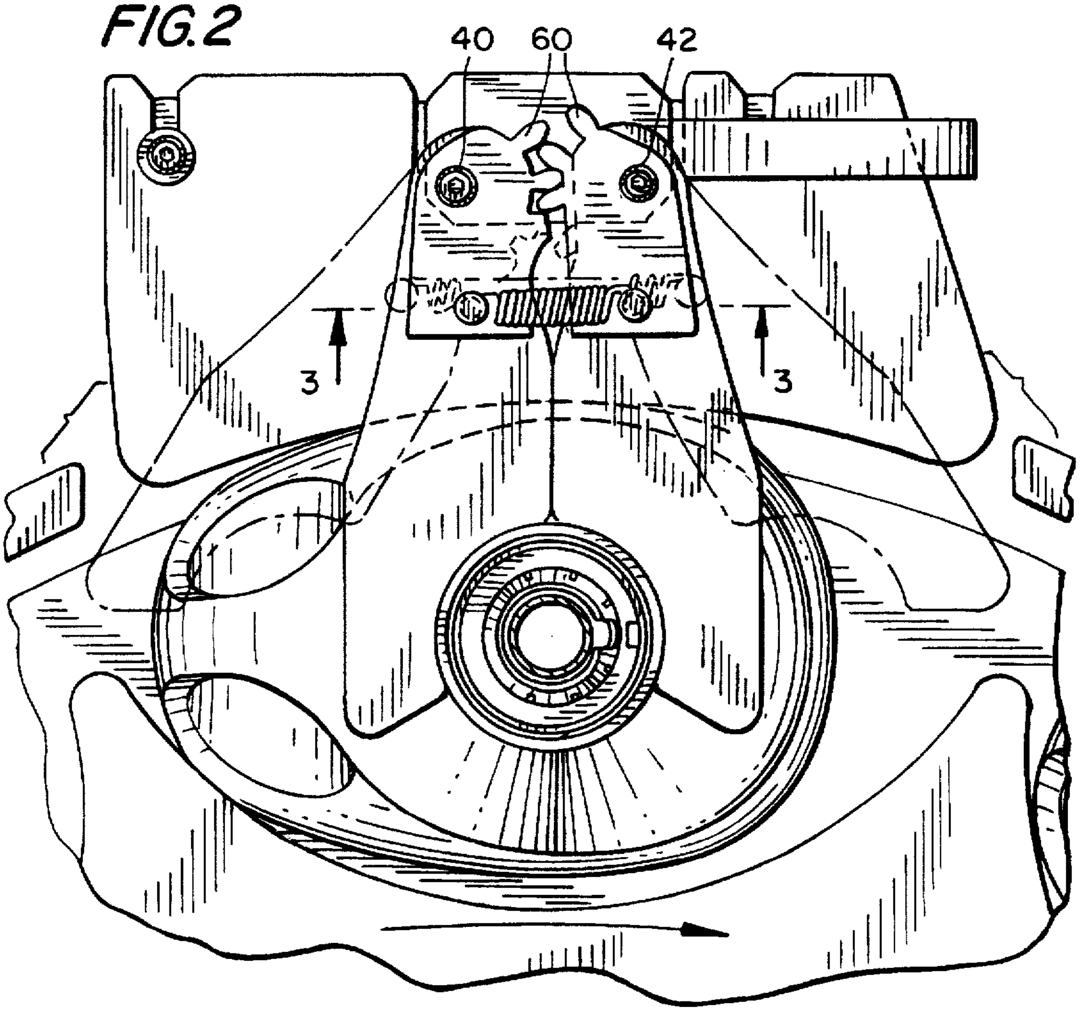
FIG. 2 is a top plan view along the lines 2—2 of FIG. 1.

As best seen in FIG. 1, the centering bracket 10 of the invention includes a supporting column 12, a supporting block 14 and gripper arms 16,20 supported on the supporting block. Gripper arms 16,20 at one end form an opening 22 which is shaped to accommodate the finish 24 of bottle 26. The gripper means includes plates 28,30 to which are attached posts 32, 34. Spring 36 is anchored at each of its two ends by the respective post 32 or 34 and serves to urge gripper arms 16 and 20 toward each other. This tends to result in bottle finish 24 being held loosely within opening 22 of the gripper arms.

Figure 7:
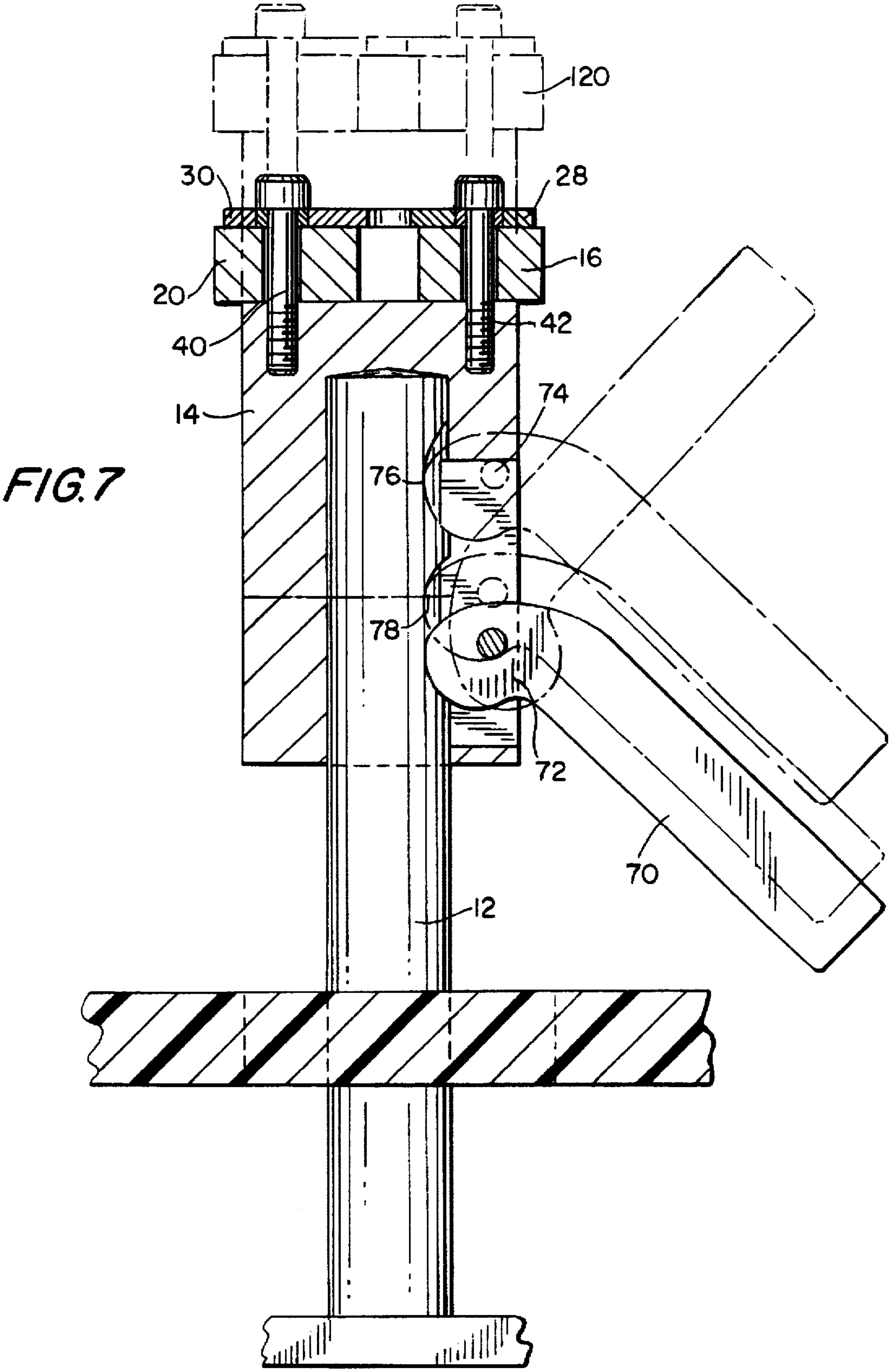
FIG. 7 is a section along the lines 7—7 of FIG. 1.

As best seen in FIGS. 1 and 7, plates 30 and 28 are secured to gripper arms 20 and 16 respectively by screws 40 and 42. Screws 40 and 42 likewise serve to secure gripper arms 20 and 16 to supporting block 14.

Figure 3:
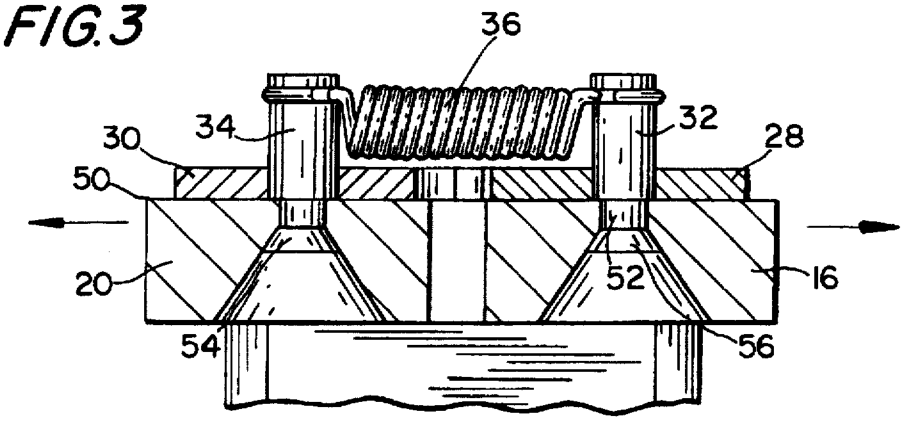
FIG. 3 is a cross-section along the lines 3—3 of FIG. 2.

As seen in FIG. 3, posts 34 and 32 also secure plates 30, 28 to gripper arms 20,16. Posts 34, 32 include below the upper surfaces of the gripper arms narrowed openings 50, 52 and trapezoidal openings 54, 56, which are wider than portions 50,52 and serve to prevent removal of posts 34,32 from the gripper arms.

Medial to the respective screws 40, 42, plates 30, 28 include intermeshing teeth 60 which facilitate movement of the two gripper arms respectively away and toward each other as the bottle is received by the gripper arms.

Lever 70 includes lever head 72 which pivots on axle 74, which is secured within supporting block 14. Lever head 72 is rounded and is sized so as to be accommodated within either of notches 76 and 78 of supporting column 12.

Foot 80 is disposed beneath gripping arms 20,16 and is positioned to abut a lower portion of bottle 26. Foot 80 includes a rectangular indentation 82 so as not to interfere with support column 12. Foot 80 is supported by support cylinder 90 which includes plate 92 and an aperture 94. Plate 92 is affixed to the underside of foot 80. Foot 80 includes a first cylindrical aperture 96 and a second cylindrical aperture 98 of lesser diameter than the first aperture.

Retaining pin 100 includes an aspect of narrow diameter 102 which is solid and an aspect of wider diameter 104. Above the aspect of wider diameter is an aspect of intermediate diameter 106. Aspect 104 and a portion of aspect 106 of pin 100 are disposed within aperture 96 of foot 80. Aspect 102 of pin 100 is retained within aperture 98 of foot 80. Aspect 102 also passes through aperture 94 as well as through the support cylinder as such. Surrounding aspect 102 as it passes through support cylinder 90 is spring 110. Solid support post 112 is received within cylinder 90 and extends downwardly to an area of greater diameter 114 and an area of lesser diameter 116 screwed into base 86.

Figure 4:
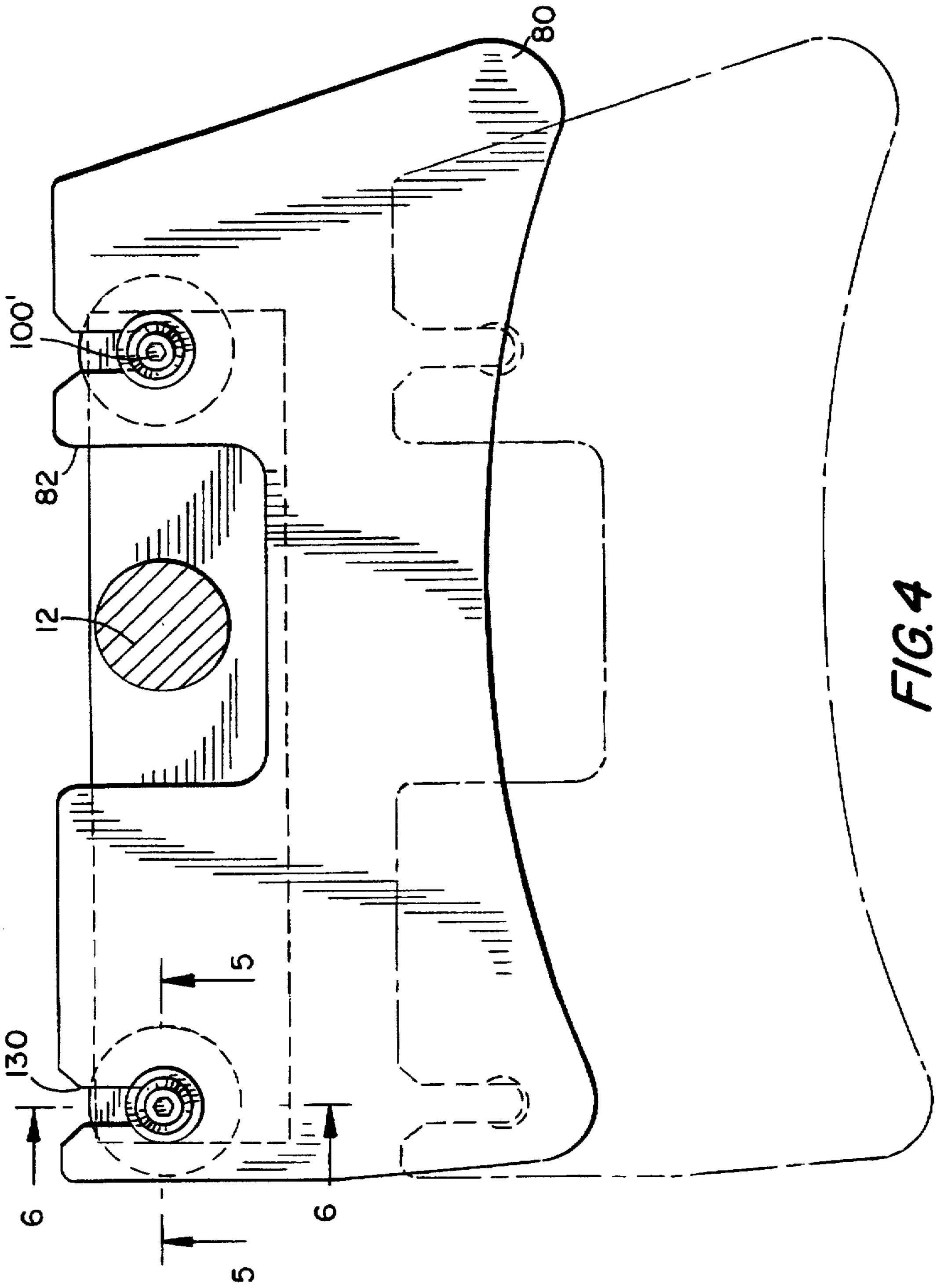
FIG. 4 is a plan view along the lines 4—4 of FIG. 1.
Figure 6:
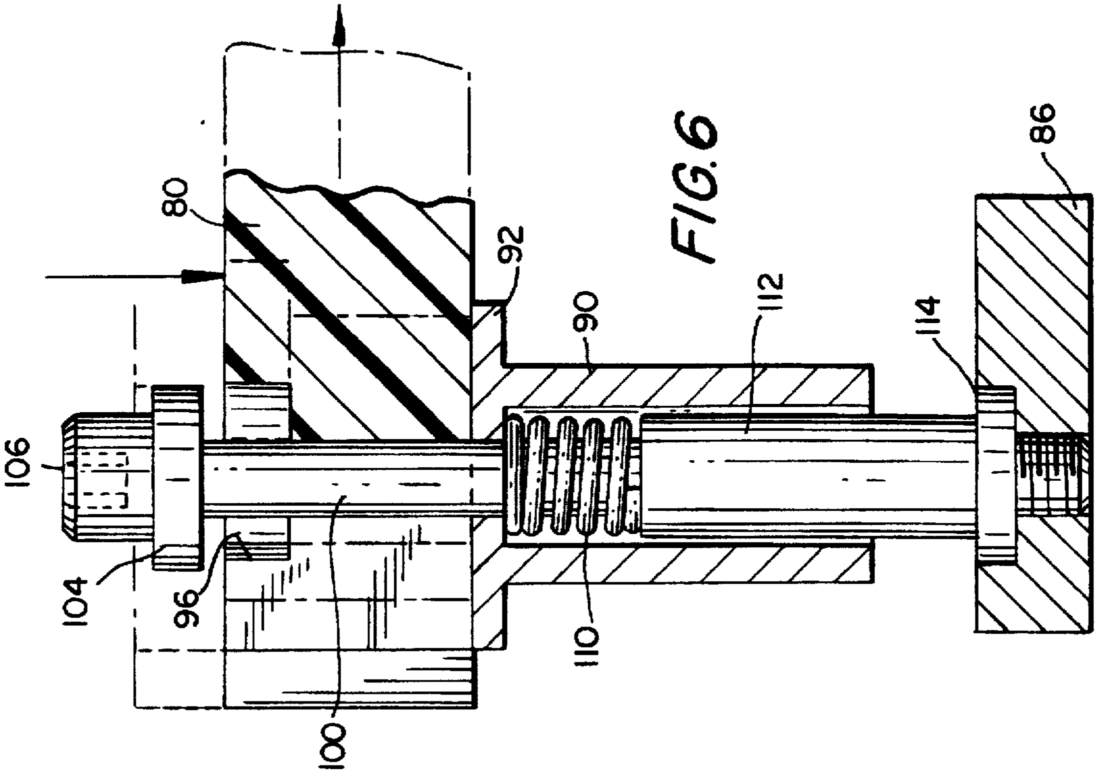
FIG. 6 is cross section along the lines 6—6 of FIG. 4.
Figure 5:
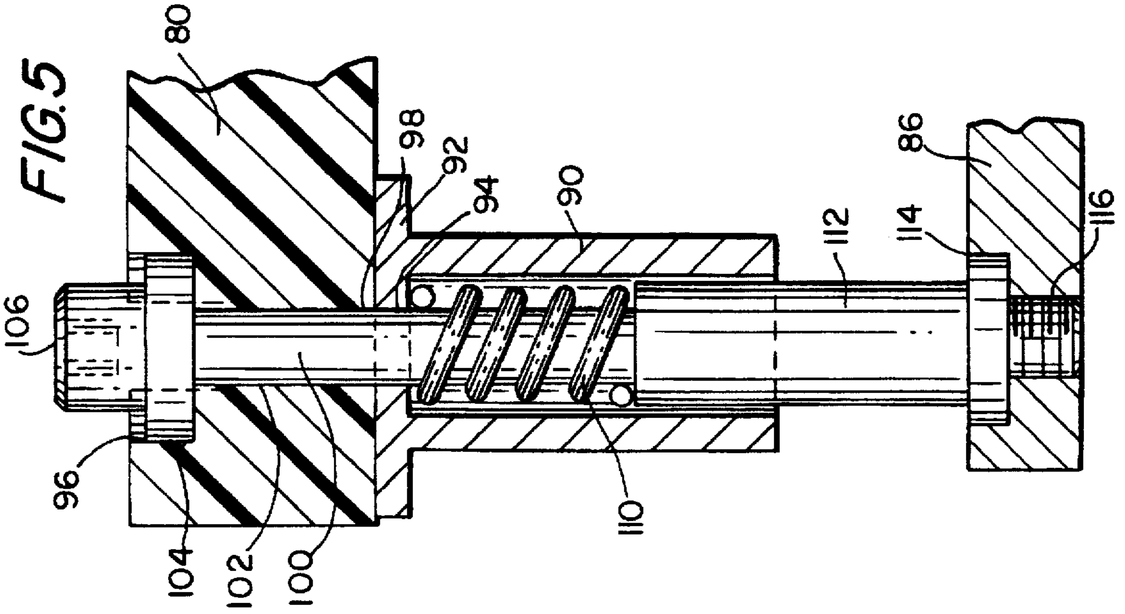
FIG. 5 is a cross section along the lines 5—5 of FIG. 4.

An additional pin $\mathbf{100}^1$ and other features corresponding to those illustrated in FIG. 5 are present on the side of foot 80 opposite to that shown in FIG. 5 as can be seen in FIG. 4.

When it is desired to change the bottles which are processed along the manufacturing line, the apparatus of the invention admits of three quick changes which makes a very speedy changeover possible. Lever 70 may be turned upwardly as seen in FIG. 7 to permit movement of supporting block 14 along the vertical axis of supporting column 12. If for instance it is desired to raise the level of the supporting block from that illustrated in solid lines in FIG. 7, the lever 70 can be raised as shown in Phantom and the supporting block raised to a new position 120 wherein the head of the lever is disposed in a second notch 76. The lever is then turned downwardly to secure the position of the supporting block at that height. Therefore, if the new bottles are simply taller than the old bottles, the only adjustment necessary can be effected by use of the lever.

If the body of the new bottle is of a different dimension from that of the old bottle whereby it is necessary to use a foot of a different size than that of foot 80, foot 80 is simply removed by urging the foot downwardly against the force exerted by spring 110 and foot 80 may then be readily removed. Slot 130 of foot 80 accommodates the removal of the foot not withstanding the presence of column 100. Absent force exerted to counter the force exerted by the spring 110, the foot will be retained in place by the aspect 104 of increased diameter the diameter of which exceeds the width of slot 130.

When the size of the new bottle finish is such that new finish grippers must be used, supporting block 14 can be raised above the supporting column 12 by raising lever 70 and exerting force upwardly on the supporting block 14. Thus, the gripper arms and supporting block and associated elements can be readily removed and replaced.

The apparatus of the invention permits very quick changeover of the centering bracket by virtue of the quick release camlock lever, which also permits very fast height adjustment.

The shoe and the gripper arms may be made of a polymeric, plastic material such as ultra high molecular weight polyethylene. The cam action lever may be made of polymeric material such as acetal resin. The balance of the apparatus is advantageously made of stainless steel.

It should be understood, of course, that the specific forms of the invention herein illustrated and described are intended to be representative only as certain changes may be made therein without departing from the clear teachings of the disclosure. Accordingly, reference should be made to the following appended claims in determining the full scope of the invention.

What is claimed is:

1. An apparatus comprising a bottle gripper removably supported on an apparatus base, said bottle gripper including a plurality of finish gripping arms forming a medially disposed finish accommodating opening, and means urging said gripping arms medially toward each other, and said apparatus further comprising a foot associated with but separate and spaced from said apparatus and positioned to support a bottle received within said bottle gripper, said foot removably supported on a foot base.

2. The apparatus according to claim 1 wherein said base comprises a supporting column from which said bottle gripper can be removed.

3. The apparatus according to claim 2 wherein said gripper includes a gripper base, which is removably supported on said apparatus base.

4. The apparatus according to claim 3 wherein said apparatus base includes a supporting column.

5. The apparatus according to claim 1 wherein said gripper means comprises gripper arms which are urged toward each other by a spring and which include interlocking teeth to facilitate movement of the arms relative to each other.

6. An apparatus comprising a bottle gripper removably supported on an apparatus base, said bottle gripper including a plurality of finish gripping arms forming a medially disposed finish accommodating opening, and means urging said gripping arms medially toward each other, said base comprising a supporting column from which said bottle gripper can be removed, said gripper including a gripper base, which is removably supported on said apparatus base, said apparatus further comprising a lever pivotally associated with said gripper base, said supporting column including a plurality of notches, said lever including a head, said gripper base being capable of being set to at least two positions, said lever head being disposed within a different one of said notches in said different positions.

7. The apparatus according to claim 6 wherein said lever locks said gripper base into position by a camming action.

* * * * *